United States Patent [19]

Nakabayashi

[11] 4,207,121
[45] Jun. 10, 1980

[54] HIGH PERFORMANCE FUSED FLUX FOR SUBMERGED ARC WELDING

[75] Inventor: Masahiro Nakabayashi, Jefferson, Ohio

[73] Assignee: Union Carbide Corporation, New York, N.Y.

[21] Appl. No.: 965,261

[22] Filed: Dec. 6, 1978

[51] Int. Cl.$^2$ .............................................. B23K 35/34
[52] U.S. Cl. .................................................... 148/26
[58] Field of Search ...................... 148/26; 75/53, 257

[56] References Cited

U.S. PATENT DOCUMENTS

| | | | |
|---|---|---|---|
| 3,320,100 | 5/1967 | Coless | 148/26 |
| 3,340,104 | 9/1967 | Ballass | 148/26 |
| 3,424,626 | 1/1969 | Coless | 148/26 |
| 3,841,923 | 10/1974 | Dudko | 148/26 |
| 4,029,934 | 6/1977 | Clark | 75/123 B |

Primary Examiner—P. D. Rosenberg
Attorney, Agent, or Firm—Eugene Lieberstein

[57] ABSTRACT

A fused flux for use especially in submerged arc welding of high strength, low-alloy pipe steels, characterized in that the flux is amorphous and nonpowdery and capable of producing low oxygen content weld metal having a high impact strength even at low temperature, the flux containing: 20–60 wt. % CaO; 15–55 wt. % $SiO_2$; 5–10 wt. % $CaF_2$; 5–15 wt. % $TiO_2$; 0–5 wt. % $Al_2O_3$; 3–15 wt. % $Na_3AlF_6$; and 5–30 wt. % MgO.

7 Claims, No Drawings

HIGH PERFORMANCE FUSED FLUX FOR SUBMERGED ARC WELDING

The present invention relates to an improved fused flux composition for use in submerged arc welding of high strength, low alloy steels of the type generally used for making pipelines for overland transmission of gas and oil. In addition, the invention relates to the combination of this improved flux and a consumable titanium-boron alloy electrode for use in this welding process.

It has been known heretobefore to employ acidic type fluxes in submerged arc welding of high strength, low-alloy steels. These fluxes generally exhibit a good operability in the sense that they can be used at high welding speeds and yet produce a weld that is smooth and ordinarily free of defects. However, the use of acidic type fluxes in welding these low-alloy steels has not proven altogether satisfactory in those instances where the welded steel is used in low temperature environments such as Artic pipelines, for example. Unfortunately, the acidic type fluxes tend to produce a high oxygen content in the weld metal and inclusions form which weaken the metal and reduce its impact strength. Basic type fluxes do not suffer from this limitation but are nevertheless restricted in use owing to the fact that they are highly crystalline and very powdery. Consequently, it is very often difficult to handle these fluxes without creating a severe dust problem.

A general object of the present invention is to provide an improved fused flux for submerged arc welding of high strength, low-alloy steels which is amorphous in form and not a dusty powder. A more specific object of the invention is to provide an improved fused flux which can operate at faster welding speeds as compared to the conventional basic fluxes of the prior art. Another object of the invention is to provide an improved fused flux which is capable of producing low oxygen content weld metal having good impact properties, particularly at low temperatures. Still another object of the invention is to provide a novel combination of fused flux and consumable welding wire for use in submerged arc welding of low alloy pipelines steels adapted particularly for use in low temperature applications.

The foregoing and other related objects and advantages and the present invention are obtained by a fused flux for use in submerged arc welding having the following composition:

| Flux Ingredients | Weight Percent |
| --- | --- |
| CaO (Lime) | 20–60% |
| $SiO_2$ (Sand) | 15–55% |
| $CaF_2$ (Fluorspar) | 5–10% |
| $TiO_2$ (Rutile) | 5–15% |
| $Al_2O_3$ (Bauxite) | 0–5% |
| $Na_3AlF_6$ (Cryolite) | 3–15 |
| MgO | 5–30% |

The fused flux of the present invention is characterized mainly by its amorphous or non-powdery nature and also by its good operability. The flux can be used to make smooth, defect-free weldments at speeds that are 30 to 50 percent faster than those possible with conventional basic fluxes of the prior art. Moreover, the fused flux is capable of producing low oxygen content weldments by the submerged arc process which exhibit high impact strength even at low temperatures of about −50° F. Satisfactory welds have been made for example using this flux which contain 200–300 ppm oxygen whereas similar welds made by using ordinary pipe welding flux contain 400–500 ppm oxygen. Furthermore, the flux of the present invention can operate successfully with AC, DC or multiple AC electrodes.

CaO, $CaF_2$ and $SiO_2$ are added to the flux formulation in order to maintain the desired fluidity and oxygen content in the weld metal. It is this specific combination of ingredients when added in the specific ranges indicated above that helps keep the oxygen content in the weld metal at a low level for optimum impact strength particularly at low temperatures and without at the same time effecting operability or destroying the appearance of the weld bead. It may be noted for example that if the amount of lime (CaO) is reduced to a level of below about 20% by weight, the flux will become too acidic and there is the likelihood that the amount of oxygen contained in the weld metal will rise to an undesirable level. Conversely, the molten deposit will be too fluid and therefore difficult to handle if more than about 60% by weight of lime is employed. The same is also true of the other ingredients; for example, if less than about 5% by weight of $CaF_2$ is used the slag will stiffen and conversely if more than about 10% by weight of $CaF_2$ is added then the slag will become too fluid.

Rutile ($TiO_2$) is added mainly for bead appearance and should be used in the amounts specified above. It is also employed to provide for good slag removal after the weld has solidified.

$Al_2O_3$ is also added for maintaining good weld bead appearance. However, this ingredient does not appear to affect oxygen content in the weld metal and therefore could be eliminated if desired.

$Na_3AlF_6$ (Cryolite) is added to the flux in order to help reduce the oxygen level in the weld metal and also for arc stability and for good bead appearance. For best result, the percentage by weight of this ingredient should also be maintained within the specific range indicated above.

The role of MgO is very important in this flux formulation. Basically, when used in the amounts specified above, this ingredient produces a flux which is amorphous in form rather than crystalline and overcomes the problem of handling a flux which is dusty or powdery.

It has been found that the flux of the present invention will produce a weld metal having optimum impact strength properties at low temperatures when used in combination with a titanium-boron welding wire in the submerged arc welding process. The use of such an electrode in this process is disclosed for example by Clark et al in U.S. Pat. No. 4,029,934, issued on June 14, 1977. In this electrode, the boron contributes to producing a very fine grain size for optimum impact strength but the problem is that boron has a high affinity for oxygen and will preferentially oxidize. The titanium is added to react with the oxygen before it has a chance to react with the boron. It is believed that when used with the more neutral flux of the present invention as opposed to an acidic flux, this welding electrode can more readily produce high impact weldments since there is less oxygen present in the weld metal. The boron can more effectively fulfill its intended purpose to minimize grain size.

The following examples will serve to further illustrate the present invention.

EXAMPLE I

A flux of the following composition was used to make pipe welds by the submerged arc process using two wire electrodes, a lead (AC) electrode and a trail (AC) electrode for both inside and outside diameter welds:

CaO: 34.0%
SiO$_2$: 31.0%
CaF$_2$: 7.5%
TiO$_2$: 8.5%
Al$_2$O$_3$: 2.0%
Na$_3$AlF$_6$: 10.0%
MgO: 7.0%

The wire diameter for each electrode was the same, 5/32 inch. For inside diameter welds, the lead wire current was 750 amps at 31 volts and the trail wire current was 650 amps at 35 volts. For the outside diameter welds, the lead wire current was 900 amps at 30 volts and the trail wire current was 550 amps at 35 volts. The welding speed was the same for both the inside and outside diameter welds, 34 inches per minute.

The flux was used with three different wire compositions A, B and C. The wire compositions in weight percent were as follows (balance predominantly iron):

| Wire A | Wire B | Wire C |
| --- | --- | --- |
| 0.1 C | 0.1 C | 0.08 C |
| 1.9 Mn | 1.6 Mn | 1.37 Mn |
| 0.7 Si | 0.9 Si | 0.07 Si |
| 0.5 Mo | | 0.27 Mo |
| | | 0.03 Ti |
| | | 0.005 B |

The plate thickness in this example was 3/4 inch and the welds were 90° groove welds. The lead and trail electrodes were maintained about 1¼ inch above the workpiece and were spaced apart approximately 5/8 inch.

Impact values were obtained in this test on two or three specimens at various temperatures down to −60° F. The location of the specimen in all cases in this example was at the center of the plate thickness. The impact values (foot-lbs.) and weld compositions (wt-%) are given in Table I below.

TABLE I

| Wire | +50° | 0° F. | −20° F. | −40° F. | −60° F. | C | Mn | Si | Ni |
| --- | --- | --- | --- | --- | --- | --- | --- | --- | --- |
| A | 36.5 | 21 | 15 | 13.5 | 16 | .07 | 1.43 | .61 | .19 |
| B | 39.5 | 23 | 23 | 15 | 11 | .08 | 1.41 | .65 | .15 |
| C | 72.5 | 53 | 48 | 38 | 30 | .06 | 1.41 | .35 | .20 |

The impact values given in Table I are average values for the two or three specimens.

EXAMPLE II

Pipe welds were made using the same flux composition as in Example I. In this example, however, the welds were square butt welds (no grooves) and the plate thickness was ½ inch. The tandem electrodes were maintained 1⅜ inch from the workpiece and were spaced ⅝ inches apart. The same wire electrodes A, B and C were used in this example. The wire diameter was also the same in all cases, 5/32 inch. For both inner and outer diameter welds, the lead wire current was 875 amps at 33 volts and the trail wire current was 775 amps at 44 volts. The welding speed was the same in both instances, 54 inches per minute. Again, impact values were taken on two or three specimens at different temperatures down to −60° F. The location of the specimens were also at the center of the plate thickness. The impact values (foot-lbs.) and compositions of the welds (wt-%) in this example are given in Table II below.

TABLE II

| Wire | +50° F. | 0° F. | −20° F. | −40° F. | −60° F. | C | Mn | Si | Ni |
| --- | --- | --- | --- | --- | --- | --- | --- | --- | --- |
| A | 72.0 | 56.0 | 43.0 | 44.0 | 25.5 | 0.08 | 1.42 | 0.54 | 0.04 |
| B | 74.5 | 45.5 | 37.0 | 39.0 | 29.0 | 0.08 | 1.34 | 0.62 | 0.04 |
| C | 90.0 | 50.5 | 37.0 | 29.5 | 24.5 | 0.07 | 1.32 | 0.37 | 0.05 |

EXAMPLE III

Pipe welds were made using the same flux composition, V groove welds and plate thickness as in Example I. The tandem electrode arrangement and spacing were also the same as in Example I. The same electrode wire diameter was also used, 5/32 inches. However, in this instance, the flux was used only with the titaniumboron electrode (Wire C) and the Charpy impact tests were taken at three different locations in the weld sample. The welds were made with a lead wire current of 750 amps at 31 volts for inside diameter welds and 900 amps at 30 volts for outside diameter welds. The trail wire current was 650 amps at 35 volts for inside diameter welds and 550 amps at 35 volts for outside diameter welds. In both instances, the welding speed was 34 inches per minute. The first Charpy impact test (Location 1) was located 1 mm. from the top edge of the plate, the second impact test (Location 2) was taken at the center of the specimen and through two overlapping welds and the third impact test (Location 3) was taken 1 mm. from the bottom edge of the plate. All of the impact tests were made at 0° F. The impact values (foot-lbs.) from these tests are given in Table III below.

TABLE III

| | Charpy Impact Full Size Specimen at 0° F. | | |
| --- | --- | --- | --- |
| Wire | Test Location #1 | Test Location #2 | Test Location #3 |
| C | 45.6 | 35.4 | 45.4 |

The values in the above table were average values of five specimens. The weld metal had a chemical analysis (wt-%) as follows:

C 0.06; Mn 1.41; Si 0.64; P 0.005; S 0.013; Ni 0.17; Cr 0.03; B 0.0006; and Ti 0.01 (average values).

EXAMPLE IV

In this example, pipe welds were made using the same flux as in Example I. A 70° included angle groove was used and the plate thickness was one inch. The tandem electrode arrangement was different in that the lead and trail was electrodes were each maintained 1-38 inch from the workpiece and were spaced one inch apart. Both A and C wires were used in this example along with a conventional wire designated Wire D and a different flux. The flux had the following composition by weight: 39.9% SiO$_2$; 2.5% Al$_2$O$_3$; 33.8% CaO; 11.3% CaF$_2$; 11.9% TiO$_2$; and 0.3% FeO. Wire D had a typical composition (wt-%) as follows: C 0.15; Mn 1.10; Si 0.25; balance predominantly iron.

The operating conditions were as follows:

| | Wire Size | Amps | Volts | Speed |
| --- | --- | --- | --- | --- |
| (1st Pass) | | | | |
| Lead (AC) | 5/32″ | 950 | 34 | 35 IPM |

| | Wire Size | Amps | Volts | Speed |
|---|---|---|---|---|
| Trail (AC) (2nd Pass) | 5/32" | 850 | 36 | 35 IPM |
| Lead (AC) | 5/32" | 1050 | 35 | 30 IPM |
| Trail (AC) | 5/32" | 850 | 40 | 30 IPM |

The impact values (foot-lbs.) for the different wire flux combinations at different temperatures down to −60° F. along with the weld metal compositions (wt-%) are given in Table IV below.

TABLE IV

| Wire | +72° F. | 0° F. | −20° F. | −40° F. | −60° F. | C | Mn | Si |
|---|---|---|---|---|---|---|---|---|
| A | 97.5 | 30.0 | 26.5 | 20.5 | 16.5 | 0.10 | 1.14 | 0.57 |
| D | 41.0 | 17.0 | 12.0 | 6.5 | 6.5 | 0.09 | 1.37 | 0.33 |
| C | — | 46.5 | 22.5 | 20.0 | 15.5 | 0.08 | 1.12 | 0.34 |

EXAMPLE V

In this example, square butt welds were made similar to those of Example II using the same flux and Wires A, C and D. The plate thickness and tandem electrode arrangement were also the same. The operating conditions were as follows:

| | Wire Size | Amps | Volts | Speed |
|---|---|---|---|---|
| (1st Pass) | | | | |
| Lead (AC) | 5/32" | 900 | 32 | 54 IPM |
| Trail (AC) | 5/32" | 800 | 43 | 54 IPM |
| (2nd Pass) | | | | |
| Lead (AC) | 5/32" | 900 | 29 | 54 IPM |
| Trail (AC) | 5/32" | 800 | 42 | 54 IPM |

The impact values (foot-lbs.) for the different flux-wire combinations at various temperatures down to −60° F. along with the weld metal compositions (wt-%) are given in Table V below:

TABLE V

| Wire | +72° F. | 0°F. | −20° F. | −40° F. | −60° F. | C | Mn | Si |
|---|---|---|---|---|---|---|---|---|
| A | 105.0 | 38.0 | 34.5 | 22.0 | 17.0 | 0.10 | 1.17 | 0.54 |
| D | 58.0 | 17.0 | 13.0 | 9.0 | 5.5 | 0.22 | 1.34 | 0.37 |
| C | 72.5 | 44.0 | 44.5 | 25.0 | 15.0 | 0.11 | 1.04 | 0.35 |

The impact values in the above table are average values for two specimens. The location of specimen was the center of the plate thickness.

It will be obvious to those skilled in the art that certain modifications in the flux composition may be made without departing from the spirit of the invention. Thus it is possible to employ minor amounts of other well known ingredients in the flux such as dolomite (CaO,-SiO$_2$) for increased mechanical properties and manganese ore for good operability.

What is claimed is:

1. A fused flux for submerged arc welding of high strength, low-alloy pipe steels, using AC, DC or multiple AC electrodes; characterized in that the flux is amorphous and non-powdery and capable of producing low oxygen content weld metal having a high impact strength even at low temperatures, the flux consisting essentially of:

20–60 wt. %: CaO
15–55 wt. %: SiO$_2$
5–10 wt. %: CaF$_2$
5–15 wt. %: TiO$_2$
0–5 wt. %: Al$_2$O$_3$
3–15 wt. %: Na$_3$AlF$_6$
5–30 wt. %: MgO

2. A fused flux according to claim 1 consisting essentially of 34.0% CaO; 31.0% SiO$_2$; 7.5% CaF$_2$; 8.5% TiO$_2$; 2.0% Al$_2$O$_3$; 10.0% Na$_3$AlF$_6$; 7.0% MgO.

3. A fused flux according to claim 1 for use in combination with a welding wire electrode containing titanium and boron.

4. A fused flux according to claim 1 for use in combination with a welding wire electrode consisting essentially of 0.08 C; 1.37 Mn; 0.07 Si; 0.27 Mo; 0.03 Ti; and 0.005 B, the balance being predominantly iron.

5. A fused flux according to claim 1 for use in combination with a welding wire electrode consisting essentially of 0.10 C; 1.90 Mn; 0.70 Si; and 0.5 Mo, the balance being predominantly iron.

6. A fused flux according to claim 1 for use in combination with a welding wire electrode consisting essentially of 1.10 C; 1.6 Mn and 0.90 Si, the balance being predominantly iron.

7. A method for submerged arc welding of high strength, low alloy pipe steels comprising depositing a fused flux consisting essentially of 20–60 wt. % CaO; 15–55 wt. % SiO$_2$; 5–10 wt. % CaF$_2$; 5–15 wt. % TiO$_2$; 0–5 wt. % Al$_2$O$_3$; 3–15 wt. % Na$_3$AlF$_6$ and 5–30 wt. % MgO upon the pipeline to be welded introducing a wire containing titanium and boron through the flux into contact with the pipeline to intitiate the submerged arc, supplying AC or DC power to the wire and then providing relative motion between the wire and pipeline to make a weld metal deposit having high impact properties at low temperatures.

* * * * *